United States Patent [19]
Morgan

[11] Patent Number: 6,029,395
[45] Date of Patent: Feb. 29, 2000

[54] BIODEGRADABLE MULCH MAT

[76] Inventor: Albert W. Morgan, 217 E. Jefferson St., Clinton, Ill. 61727

[21] Appl. No.: 09/003,292

[22] Filed: Jan. 5, 1998

[51] Int. Cl.$^7$ .................................................... C09K 17/52
[52] U.S. Cl. ..................................................................... 47/9
[58] Field of Search ...................................... 47/65.9, 65.8, 47/9, 58.1

[56] References Cited

U.S. PATENT DOCUMENTS

| | | |
|---|---|---|
| 3,387,405 | 6/1968 | Iwasyk et al. . |
| 3,812,615 | 5/1974 | Jamison ......................... 47/9 |
| 3,871,130 | 3/1975 | Lavo ............................. 47/9 |
| 3,889,417 | 6/1975 | Wood et al. . |
| 4,067,140 | 1/1978 | Thomas . |
| 4,214,034 | 7/1980 | Kodera et al. . |
| 4,297,810 | 11/1981 | Hansford ....................... 47/9 |
| 4,339,890 | 7/1982 | Koenig et al. . |
| 4,369,054 | 1/1983 | Shinholster, Jr. et al. . |
| 4,414,776 | 11/1983 | Ball . |
| 4,686,790 | 8/1987 | Lahalih et al. . |
| 4,910,052 | 3/1990 | Caldwell . |
| 5,082,500 | 1/1992 | Nachtman et al. . |
| 5,464,878 | 11/1995 | Nemphos et al. . |
| 5,516,830 | 5/1996 | Nachtman et al. . |
| 5,607,494 | 3/1997 | Kim . |
| 5,662,724 | 9/1997 | Kim . |

FOREIGN PATENT DOCUMENTS

| | | | |
|---|---|---|---|
| 2-176184/23 | 5/1990 | Japan .......................... | 47/9 |
| 2-278805/37 | 8/1990 | Japan .......................... | 47/77 |
| 6-153689 | 6/1994 | Japan .......................... | 47/77 |

OTHER PUBLICATIONS

Wallbrown, "Rolled Paper as a Mulch in tomatoes", WVU Extension Service (1996).

Abdul–Baki, et al. "A no–tillage tomato production system using hairy vetch and subterranean clover mulches", Hort Science 28(2): 106–108 (1993).

Anderson et al. "Evaluation of a Paper Mulch Made from Recycled Materials as an Alternative to Plastic Film Mulch for Vegetables" Journal of Sustainable Agriculture, vol. 7, No. 1 (1995).

*Primary Examiner*—Charles T. Jordan
*Assistant Examiner*—Jeffrey L. Gellner
*Attorney, Agent, or Firm*—Thomas E Kelley

[57] ABSTRACT

Biodegradable mulch mat comprising an air and water-permeable, light-impermeable, open celled, composite of granules and fibers in a binder matrix prepared from a foam precursor. Biodegradable fibers include cellulosic fibers such as shredded wood, straw, paper, corn stalks, cotton fiber and mosses; protein fibers such as hair; and synthetic polymer fibers such as vinyl polymer fibers and polyamide fibers. Granules include milled hard vegetation such as corn cob, nut shells, seed hulls, seeds, gourds and bark. The mulch mats can also comprise pigments, fungicides, soil builders such as vermiculite, perlite, sand, diatomaceous earth and gypsum; nutrients such as nitrate, potassium and phosphorus compounds; soil conditioners such as limestone, sulfur and iron sulfate. Useful binders include polysaccharides, glycosides, vegetable gums, vinyl polymers, waxes and crosslinkable oils. Useful surfactants include saponins, e.g. extract of Yucca shidigera, and amine surfactants. Slurries of fibers, granules, binder and surfactant are gas entrained, e.g. by whipping, to provide a foam which is applied to soil around seedlings; the foams dry to a durable, biodegradable mulch mat which suppresses weeds, builds soil, conserves soil and water and improves soil temperature providing an enhanced growing environment.

19 Claims, No Drawings

BIODEGRADABLE MULCH MAT

Disclosed herein are biodegradable mulch mats useful in agriculture and soil conservation, precursor foams for such mulch mats, and methods for making and using such mulch mats and foams.

BACKGROUND

Various materials have been used as agricultural mulch to enhance plant growth and improve soil, e.g. by conserving water, elevating soil temperature, controlling weeds, and adding organic matter to soils. Such materials have included straw, composted matter, manure, shredded bark and wood, fabric and plastic film. A decision to use mulch is usually based on the ability to achieve improvements over non-mulching agriculture which may require intense cultivation to control weeds and conserve water. Among the common mulch materials, plastic film is preferred for use with many cash crops, e.g. vegetables and ornamentals, due to its low cost and effectiveness in weed control and elevating soil temperature. Among the disadvantages of plastic film are poor distribution of irrigated water and the need to strip the film from fields after the growing season. Moreover, plastic film does not improve soil as organic mulch materials can do when incorporated into the soil after a growing season.

A soil with preferred tilth may comprise nearly equal volumes of air, aggregate, organic matter and water. An advantage of biodegradable mulch is that it can contribute to the a preferred level of tilth when used mulch is incorporated into the soil.

SUMMARY OF THE INVENTION

This invention provides biodegradable, durable mulch mats which are readily applied to soil or other growing medium and provides desirable conservation of soil and water, weed control and soil temperature maintenance which promote enhanced agricultural production. One aspect of this invention provides air and water permeable, expanded mulch mats of biodegradable components, i.e. fiber, granules and binder. The mulch mats have an expanded, e.g. open-celled, foam structure which is air and water permeable and which provides retention and distribution of water to the soil and desired oxygen access to the soil. In preferred aspects of this invention the mulch mat exhibits the unique properties of high water absorbtion and retention and high water permeability after saturation. In preferred aspects of this invention the expanded mulch mats are light impermeable for enhanced weed suppression. In still other aspects of the invention, the mulch mat provides a medium for rooting seeds in a weed-suppressed environment. The mulch mat can be formulated to be durable throughout the expected growing season or longer. After the growing season the biodegradable mulch mat can be readily incorporated into the soil to improve tilth by increasing soil openness and organic matter.

Another aspect of this invention provides aqueous foams which are adapted to be applied in layers over soil or growing medium to provide the mulch mats of this invention. In preferred aspects of the invention foams comprise gas-entrained, aqueous slurries of biodegradable fiber, granular material, binder and surfactant.

This invention also provides methods of applying biodegradable mulch mat to the surface of soil or other growing medium from an aqueous foam. Another aspect of the invention provides a method of seeding using the foams and mulches of this invention.

DETAILED DESCRIPTION OF PREFERRED EMBODIMENTS

As used herein the term "percent solids" is based on all non-aqueous, air-free, components of a formulation. As exemplified herein, the components of slurries useful for making foams which are precursors to mulch mats are typically solid or can be dried to a solid or non-aqueous liquid of high vapor pressure; thus, the "percent solids" represent the non-aqueous components.

As used herein "biodegradable" refers to a mulch mat or component thereof which is readily decomposed or consumed by microorganisms such as fungi or bacteria. Although the fiber and granule components of a mulch mat are themselves biodegradable, in general the binder component will be more readily biodegradable. That is, the biodegradability of a mulch mat will, in general, depend on the binder or combination of binders in the mulch mat. The useful life of a mulch mat can be controlled by selection of the binder and can be as short as about two months, as long as up to about 3 years, or an intermediate life, e.g. in the range of 4 to 6 months, 10 to 12 months or 18 to 24 months. As described herein, the biodegradability of a mulch mat can be manipulated by selection of binder or addition of anti-microbe agents.

This invention provides an air and water-permeable, expanded mulch mat comprising biodegradable fibers, granules and binder which are preferably in a light-impermeable, open-celled foam structure. While the dimensions of a mulch mat are not critical, it should be apparent that in one aspect of this invention a mulch mat is a unitary layer coating the growing medium in the vicinity of the plant intended to be mulched, as opposed to a plurality of pieces of mulch.

Biodegradable mulch mats can be prepared from a foamed dispersion of biodegradable fibers, granules and binder. When the wet foam dries the mulch mat is formed with fibers and granules maintained in an expanded, e.g. open-celled foam, structure by the binder. Such open-celled mats are preferably permeable to water and air and impermeable to light. Mulch mats prepared without fiber or without granules tend to have undesirable properties, e.g. high frangibility or impermeability. For instance, mulch mats prepared without granules tend to have the properties of paper mache without an open-celled structure. Very thin mache mats are so open to light as to be ineffective in suppressing weeds. Thicker mache mats tend to be excessively frangible and prone to cracking resulting in high weed growth through cracks. Very thick mache mats while durable tend to be highly impermeable which does not enhance plant growth.

The mulch mats of this invention comprise biodegradable fibers which can be natural or synthetic fibers, e.g. cellulosic fibers, protein fibers or synthetic polymer fibers. Natural fibers can comprise cellulose fibers such as wood pulp, shredded wood, shredded paper including tissue, newsprint and cardboard, shredded pine straw including needles, cones, twigs and branches, shredded corn stalks, straw, flax fibers, cotton fiber, shredded composted vegetation, fibrous sphagnum moss or peat moss. Protein fibers can comprise hair, gelatin or keratin. Biodegradable synthetic fibers can comprise reconstituted cellulose fibers such as rayon fibers, vinyl polymer fibers such as fibrous polyvinyl alcohol and polyamide fibers. In preferred embodiments of this invention the mulch mats will comprise fiber having a high aspect ratio of length to diameter, e.g. of at least 3, more preferably of at least 10 and even more preferably of at least 30. In general fine fibers, e.g. from shredded newsprint, are preferred due to the low cost of shredded newsprint and because of the superior performance of such fine fibers over larger fibers such as straw. Because black ink used in newsprint is typically biodegradable, shredded newsprint with black ink is preferred over newsprint with colored ink. Even more preferred is unprinted shredded news stock, e.g. overstock, leader or roll ends of newsprint.

The biodegradable mulch mat of this invention also comprises granules which can be biodegradable or not. Biodegradable granules can comprise organic particulate prepared by milling hard vegetation such as wood including wood flour and saw dust, seeds including dry corn and soybeans, seed hulls including grain and bean hulls, nut shells, corn cobs, gourds and bark or by milling dry vegetation like mosses, leaves and composted vegetation. In view of utility and availability, preferred granules comprise wood flour, milled corn cobs, milled nut hulls, milled bean hulls, milled grain hulls, milled corn or milled soybean or a mixture thereof or a mixture with other granules. Preferred granules have an average particle size less than 1 millimeter, often preferably smaller, e.g. on the order of 10 to 100 micrometers. The amount of granules used in a mulch mat can vary widely. For instance, mulch mats of this invention can comprise fiber and granules in the weight ratio of fibers to granules in the range of about 0.05:1 to 10:1, preferably in the range of 0.1:1 to 5:1. In many cases, the ratio will preferably be in the range of 0.3 to 2:1.

The biodegradable granules can optionally be supplemented with non-biodegradable granular material which can comprise particulate soil builders, nutrients and conditioners. Particulate soil builders can include mineral particles, for example milled vermiculite, perlite, sand, diatomaceous earth, gypsum and the like. Particulate nutrients can comprise nitrogen, potassium and phosphate compounds, e.g. ammonium nitrate, potassium nitrate and potassium phosphate. Particulate soil conditioners, e.g. for adjusting the pH of the soil, can comprise milled limestone, sulfur, iron sulfate and such materials.

The amount and type of binder used can vary depending on the properties desired in the mulch mat in which binder serves to hold fibers and granules in an expanded structure formed by foam. Useful binders can comprise natural or synthetic materials, e.g. biodegradable polymers including polysaccharides such as starch, glycosides, vegetable gums, protein such as gelatin and milk solids and synthetic polymers such as polyvinyl acetate. In many cases, e.g. where it is desired that mulch mat have a long life or enhanced resistance to severe wind and rain environments, it is useful to employ water repellent binder which can include polyvinyl acetate and crosslinkable vegetable oil such as linseed oil, acacia gum, gum arabic or guar gum. Other water resisting binders include camphor, rosin gum, pine tar, paraffin wax, beeswax, asphalt emulsion, vinyl polymer emulsions or acrylic polymer emulsions. Preferred water repellent binders include polyvinyl acetate and guar gum. In addition to binding fibers and granules polymer binders can serve to thicken solutions from which foams are produced, e.g. to improve pumpability or foaming through increased viscosity. The amount of binder, e.g. in proportion to the amount of solid fiber and granules, together with other variables such as mat thickness and density, can influence the life of the mulch mat, e.g. higher amounts of binder tend to provide longer life mulch mats. The selection of binder greatly affects the biodegradability of a mulch mat and hence the service life which can be designed to be as short as 2 to 6 months or as long as 3 years or more. An advantage of using water soluble polymeric binder is that a certain amount of binder may leach from the foam as the foam is applied resulting in a bonding between the mat and a top layer of soil, e.g. about ½ to 1 cm deep. The extended soil/mat interface assists in holding a mulch mat to a sloped terrain. Leached binder can also promote unification of the top layer of soil under the mulch mat.

Mulch mats are prepared from foamed slurries of fibers, granules, binder and surfactant in an aqueous medium. The amounts of materials can vary widely depending on the application as illustrated herein. Useful foams for preparing effective mulch mats of this invention can be prepared in a wide range of formulations which can be readily determined by routine experimentation using the formulations set forth in the following examples as a guide. For instance, on an air free basis useful slurries can comprise from about 5 to 35 weight percent solids. On a dry (water-free) basis useful ranges of components are 1 to 12 parts by weight fiber, 1 to 50 parts granules including biodegradable granules and supplemental particulate additives, 1 to 40 parts binder and 1 to 50 parts surfactant. In preparing such slurries the fibers and granules can be pre-coated with other components of the mat or foam precursor such as polymeric binder, surfactant foaming agent or other adjuvants, e.g. colorants, fungicides, nutrients, conditioners and soil builders. For instance, water-insoluble binders such as beeswax and paraffin wax can be applied to fibers or granules as a pre-coat. For many formulations it is preferred to add such other components separately. Slurries of the components used to make mulch mats of this invention tend to be stable and can be stored for extended periods. Because the components, e.g. surfactants and binders, are typically organic, they can be attacked by microorganisms resulting in fermentation of stored slurries. Thus, it is preferred to add more readily biodegradable materials, e.g. surfactants, just prior to foam preparation and application. Moreover, because surfactants promote foam formation, it is especially preferred to add surfactant as a final ingredient after homogeneous slurries have been prepared by mixing the other components.

The amount of surfactant used will depend on its ability to promote foam formation by reducing the surface tension of the liquid medium of dispersed material. Useful surfactants include saponins, fatty acid amine oxides and fatty acid amine adducts. Because surfactants are relatively small molecules which can leach from a mulch mats, it is preferable to use a natural surfactant which is less damaging to root function than certain of the more conventional surfactants such as sulfonic acids. Preferred saponin surfactants include the steroidal saponins such as extracts from Yucca shidigera which not only is effective in generating a foam precursor for mulch mats but which is also effective in controlling plant root pests such as nematodes. Other useful amine surfactants are available from PPG including the Mazox brand amine oxides such as Mazox CAPA cocamidopropyl amine oxide (hereinafter "CAPA"), Mazox LDA lauramine oxide and Mazox CDA palmitamine oxide and the Mazamide alkanolamides such as Mazamide 80 which is a 1:1 adduct of coconut oil: di-ethanolamine. Other useful surfactants include cocamidopropylaminobetaine, PEG(6) cocamide, sorbitan monostearate and cocamidopropylhydroxysultane. In selecting from among the various available surfactants, amine surfactants are generally more effective in foam formation but are more abusive to plants intended to be protected by the mulch mat. Although higher quantities of saponin surfactants may be required to produce a desired foam, the saponins are preferred because they are less abusive to desired plants.

The mulch mats of this invention can also comprise other adjuvants including, but not limited to, colorants, seeds, antioxidants, UV-absorbers and fungicides. Mulch mats can be provided in a variety of colors, e.g. for aesthetic landscaping or identification of treated soils. Mats made from shredded newsprint as the fiber source tend to be gray in color. Iron oxide pigments and other agriculturally safe pigments can be used to provide other colors such as gold, brown, red, yellow, orange and green tints. Anti-oxidants such as BHA and BHT and UV-absorbers are useful in extending the life of mulch mats. The incorporation of fungicide or bactericide into mulch mat is also useful to prevent premature degradation of the mulch mat from microorganisms in moist environments. Fungicides are selected on the basis of permitted use for selected plant applications, e.g. Dowacil 75 brand substituted phenol fungicides for ornamental plant applications. Useful fungicides for vegetable applications include quaternary ammonium compounds.

The mulch mat of this invention is effective in suppressing growth of plants from seed from beneath the mat due to the light impermeability of such mat. In general, seeds incorporated into mulch mat will not grow unless they are located sufficiently close to the top surface that the cotyledon is exposed to light and/or the cell structure of the mulch mat is coarse. For instance, mulch mats which are prepared from shredded pine straw (comprising needles, cones, twigs and branches) as a source of fiber are more conducive to being a seed germination mat than is a mulch mat prepared from shredded newspaper fiber. The germination and successful growth of seeds within a mulch mat is also generally enhanced in proportion to the size and number of seeds, e.g. large seeds such as pumpkin or squash are more likely to germinate and thrive than smaller seeds. The mulch mat is also effective in suppressing growth of fugitive seed landing on the mat. Surprisingly, however, the mat can support germination and growth of seeds growing in a seed germinating/growth medium located on the top surface of a mulch mat. For instance, seeds which are sown in a moist potting soil mix placed on the surface of mulch mat can germinate and have roots penetrate the open cell structure of the mulch mat and grow into the subsoil. This property is useful in cases where it is desirable to establish vegetation on soil that is ripe with undesirable seeds and on highly sloped soils where the mulch mat can retard erosion. For instance, a mixture of seed and potting soil can be broadcast onto a mulch mat located on a highly sloped surface. In this regard a cohesive mulch mat is also especially useful for retaining soil against erosion, e.g. on slopes, in drainage ditches, on river banks, at construction sites and the like. Mulch mats precursor foams can be readily formulated to have a sufficiently high slump factor so that the applied foam will remain in place on a sloped surface and dry into an open-cell mulch mat on slopes of up to 45° or more, for instance on vertical surfaces. A mulch mat for controlling soil erosion can be prepared with a water repellent binder for long term use or with a more water soluble binder for more temporary use, e.g. on construction sites where soil is being moved often. Mulch mats for soil retention applications can be used as is over wide areas of soil, used around plantings such as soil retaining trees or shrubbery, or used as seed bearing mat for planting seeds of soil control vegetation such as crown vetch, grasses and the like. The use of mulch mat in seed bearing applications as discussed above is illustrated more particularly in the following examples.

Open cell mulch mats are prepared by applying a liquid foam comprising a gas-entrained, slurry of fibers, granules, binder and surfactant to the surface of the soil to be covered. A liquid foam can be prepared by entraining a gas, e.g. air or carbon dioxide, by a variety of means into a slurry of fibers and granules in a liquid medium containing surfactant and polymeric binder. One method of preparing a foam is to whip a slurry comprising fiber, granules, binder and surfactant with a high speed mixer, e.g. a plurality of rods extending from a central shaft. An illustrative simple apparatus for creating foams is the ubiquitous, high speed, kitchen blender which is useful for preparing small quantities of foams for small applications or for the development of foam formulations. Larger scale foaming can be effected by high speed mixing of surfactant-containing slurries. In some cases foaming is enhanced when gas pressure is applied to the surface of the mixing slurry or when the gas is injected below the surface of the mixing slurry. Another method is to inject the foaming gas into the slurry passing through an application nozzle. Where unfoamed slurries will have a specific gravity of about 1 g/cc, the foams will have a specific gravity in the range of 0.1 to about 0.3 g/cc. Although foams cannot be readily drawn or sucked into a conduit, foams are readily pushed through a conduit. Thus, a preferred pump for preparing and/or transporting a foam will have an open impeller on a submerged pump. Foam transportation into a pump suction can be assisted by increasing the liquid head of the foam by applying gas pressure to the surface of the foam within a closed vessel. Such foams are not only useful in providing open cell mulch mats of this invention but such foam is also useful for repairing damaged or torn mulch mat.

Foams as prepared and applied to the surface of a growing medium will shrink as the fibers and granules are combined into a cohesive, open-celled composite. Although preferred thickness of foams will vary depending on factors such as percent solids, quality of binder and the like, in general foams for light, e.g. greenhouse, applications can be applied thinner than for more severe, e.g. open field, applications. For instance, for greenhouse applications it may be adequate to apply foam at 2 to 3 cm thick where the same foam should be applied at 2 to 8 cm thick for field applications. The mulch mat of this invention will be effective in suppressing weed growth unless the integrity of the mat is compromised, e.g. by cracks, biodegradation or soil deposition on the top surface of the mat. For instance, a foam of about 34% solids applied at about 3 cm high will typically reduce to a mulch mat having a dry height in the range of 0.5 to 1.5 cm. Such foam dries to a tough, open cell layer of a composite of fibers and granules bonded together by the polymer binder. An open-celled, mulch mat can assist in distributing irrigation water and rain water, preventing erosion, and holding water for slow release by wicking retained water to the subsoil. For instance, a mat according to this invention can absorb and hold about 2 to 3 times its weight in water or more. A mulch mat can be provided in a desired thickness in proportion to the rate of application of foam to the underlying area of subsoil and the concentration of fibrous and granular material in the foam.

The foams of this invention will comprise on a air-free weight basis about 5 to 35 weight percent solids, for weed suppression preferably at least about 7 weight percent, more preferably in the range of 10 to 25 weight percent solids. As a guide for preparing mulch mat for evaluation using newsprint as a source of fiber, it is useful to know that one double page of newspaper 68×58 cm (27×23 inches) weighs about 20 g and will cover an area of 0.4 square meters (4.3 sq ft). Thus, 1000 g of a foamed slurry at 5.4% newspaper concentration (54 g of shredded newspaper fiber) will cover 1 m² (10.8 sq ft) of soil at an equivalent of single sheet coverage. As a rule of thumb, mulch mats providing the equivalent of double sheet coverage—about 108 g of shredded newspaper fiber per square meter of mulch—provides fair weed suppression. And, mulch mats providing the equivalent of triple sheet coverage—about 160 g of shredded newspaper fiber per square meter of mulch—gives excellent weed suppression. The application of a certain amount of shredded newspaper fiber per square meter of soil can be effected by using higher solids formulations or by multiple coatings of foam. It is understood that the addition of granules can enhance the weed suppression effect of a mulch mat so that lower amounts of fiber can be used to achieve the desired high degree of weed suppression.

With a wide variety of components from which to choose, useful foams for mulch mats can be prepared from slurries prepared from a variety of components in widely varying formulations. For instance, a low solids slurry (6%) is useful for suppressing weed growth and growing seed sown over the mulch mat and a high solids slurry (18%) is especially useful in suppressing weed growth. Such slurries can be prepared with the following formulations:

| Component | low solids parts by weight | high solids parts by weight |
|---|---|---|
| corn starch | 0.25 | 2.8 |
| shredded newsprint | 2.5 | 3.2 |
| Yucca shidigera extract (3.5%) | — | 6.9 |
| CAPA | 0.8 | — |
| wheat flour | 0.9 | 1.4 |
| milled corn cob (100–80 mesh) | 1.6 | 4.1 |
| polyvinyl acetate emulsion (50%) | — | 5.5 |
| guar gum | 0.15 | — |
| fungicide | 0.006 | — |
| water | 94 | 78.2 |
| solids | 6% | 18% |

Mulch mats of this invention will preferably have a high cohesiveness as measured by a dropped dart, e.g. a 28 gram dart. Useful mulch mats will survive dart impact testing without cracking with impact stress of about 0.4 kilogram-meters (3 foot pounds) or more.

The following specific examples are presented to more particularly illustrate the invention and should not be construed as being limitations on the scope and spirit of the invention.

EXAMPLE 1

This example illustrates the preparation of an embodiment of a foam of this invention useful for casting biodegradable mulch mats. Foam slurries were prepared by combining water, Yucca shidigera extract steroid saponin (50% in water), wheat flour binder, shredded newsprint fiber and ground corn cob (80 mesh) granular material in the proportions listed in Table 1 and whipping for 60 seconds in a kitchen-type blender. Each formulated foam was poured in a layer about 2.5 cm thick over separate seeded trays containing about 100 seeds of annual rye grass, 50 seeds of collards and 50 seeds of lettuce and allowed to dry to a mulch mat. The mulch mat-covered trays and a control tray were maintained at 70° C., illuminated by artificial light from growth lamps and watered to saturation weekly.

TABLE 1

| Component | Sample 1-A | Sample 1-B | Sample 1-C | Control |
|---|---|---|---|---|
| Deionized water | 180 grams | 180 grams | 180 grams | — |
| Yucca extract | 20 | 20 | 20 | — |
| Wheat flour | 4 | 4 | 4 | — |
| Shredded newsprint | 20 | — | 10 | — |
| Ground corn cob | — | 20 | 10 | — |
| Days after mulching | | Seedling Count | | |
| 7 | 0 | 14 | 0 | 21 |
| 14 | 9 | 20 | 0 | 39 |
| 21 | 12 | 27 | 0 | 95 |
| 28 | 13 | 30 | 2 | >100 |

The periodic seedling count for each tray which is reported in Table 1 illustrates the effectiveness of the mulch mats of this invention in suppressing subsoil seed growth. Also illustrated is the synergistic effect of combining both fibers and granules in a mulch mat as compared to the use of either fibers or granules material alone.

EXAMPLE 2

This example illustrates the effectiveness of fine fiber in the mulch mat of this invention as compared to larger fiber, e.g. pine straw. The procedure of Example 1 was followed except that the fibers and granules used in the foam formulations was as specified in Table 2 where pine straw is a shredded mixture of white pine needles, cones, twigs and branches.

TABLE 2

| Component | Sample 2-A | Sample 2-B | Sample 2-C | Control |
|---|---|---|---|---|
| Deionized water | 180 grams | 180 grams | 180 grams | — |
| Yucca extract | 20 | 20 | 20 | — |
| Wheat flour | 4 | 4 | 4 | — |
| Shredded newsprint | — | — | 5 | — |
| Ground corn cob | — | 20 | 10 | — |
| Pine straw | 20 | 20 | 5 | |
| Days after mulching | | Seedling Count | | |
| 28 | 50 | 15 | 2 | >100 |

EXAMPLE 3

This example illustrates a variety of binders that are effective in producing water resistant mulch mat. A slurry was prepared using the components identified in the formulation described in Table 3. The slurry was whipped in a blender for 60 seconds into a foam, poured onto a porous tray and allowed to dry to form an open-celled mulch mat. A 2.5 cm cubic sample of the mat was immersed in a 100 ml volume of water for 14 days then air dried with retention of the open cell structure illustrating the effectiveness of the binders in producing a water repellent mulch mat. The procedure was repeated substituting each of beeswax, pine tar, gum arabic, rosin gum, camphor, guar gum and corn starch for the paraffin wax component; each of the resulting mulch mat samples remained intact with an open cell structure after the 14 day immersion except for the corn starch-containing mat which disintegrated after 3 days immersion.

TABLE 3

| Component | parts by weight |
| --- | --- |
| paper slurry (1.72%) | 140 |
| wheat flour | 5 |
| CAPA surfactant | 30 |
| water | 42 |
| paraffin wax | 10 |

EXAMPLE 4

This example illustrates the preparation of a water resistant mulch mat in larger volume apparatus. A cellulose slurry was prepared by adding 50 g of toilet paper to 2 kg of water which was circulating (via a ⅓ horsepower sump pump) in a 113 liter (30 gallon) drum. The following components were mixed and added to the fiber slurry:

67 g of starch in 360 g water 532 g of corn cob flour (180-80 grade)

266 g of polyvinyl acetate (30% emulsion in water)

67 g of guar gum 266 g of CAPA surfactant 1500 g water

The resulting slurry comprised about 25% solids and was not readily converted to a foam by continued pumping. Additional water was added to produce a slurry of about 23% solids which was converted to what is characterized as a "poor" foam. Still more water was added to produce a slurry of about 20% solids which could be mixed by additional pumping to produce what is characterized as a "good" foam. Even more water was added to produce a slurry of about 13% solids which could be mixed to produce what is characterized as a "superior" foam.

EXAMPLE 5

This example illustrates the use of a pine straw-fibered mulch mat prepared with Yucca extract surfactant as a seeding aid for certain plants. A slurry was prepared using the components indicated in Table 5A (where shredded pine straw is as described in Example 2) and aliquots of the slurry were mixed with a quantity (50–100) seeds of a variety of species. Flats were prepared with bedding mix and fertilizer and watered. The seed-mixed slurries were whipped to a foam and applied in 2.5 cm (1 inch) dots on the bedding mix to provide areas of seed-containing mulch mat. As a control the same amount of each variety of seeds per unit area was applied without foam on the bedding mix. The amount of germination after 3 weeks is reported in Table 5B.

TABLE 5A

| Component | parts by weight |
| --- | --- |
| water | 3500 |
| pine straw | 500 |
| corn starch | 6 |
| dried milk | 6 |
| wheat flour | 6 |
| guar gum | 6 |
| Yucca extract | 50 |
| Milled corn cob | 100 |

TABLE 5B

| | Percent germination | |
| --- | --- | --- |
| Seed species | Seed alone | Seed in foam |
| alyssum | 90 | 35 |
| zinnia | 70 | 40 |
| marigold | 4 | 4 |
| ageratum | 0 | 40 |
| cenaurea | 50 | 50 |
| dianthus | 60 | 60 |
| snapdragon | 0 | 0 |
| parsley | 0 | 0 |
| lettuce | 90 | 90 |
| thyme | 95 | 95 |
| radish | 7 | 5 |
| basil | 60 | 60 |
| shallots | 0 | 0 |

EXAMPLE 6

This example illustrates the use of mulch mat in germination of seed applied in the foam and on an applied foam. A slurry was prepared using the components listed in Table 8 and whipped into a foam; rye grass seed was admixed into one of the foams.

TABLE 6A

| Component | Slurry 6-A | Slurry 6-B |
| --- | --- | --- |
| water | 86 parts | 86 parts |
| starch | 4 | 4 |
| wheat flour | 4 | 4 |
| Yucca extract (50%) | 20 | 20 |
| 4.6% newsprint slurry | 50 | 50 |
| corn cob (180–80) | 6 | 6 |
| rye grass seed | — | 5 |

Potting soil trays were filled with a perlite/peat moss seeding mixture, time release fertilizer and watered. Two of the trays (Tray 6-1 and Tray 6-2) were seeded with 5 grams of rye grass seed each. One of the rye-seeded trays (Tray 6-1) was not covered with mulch. The other rye-seeded tray (Tray 6-2) was covered with seed-free foam using Slurry 6-A which dried to a seed-free mulch. The tray which was not seeded with rye (Tray 6-3) was covered with seeded foam using Slurry 6-B which dried to a seeded mulch. The results of germination are reported in Table 6B showing that foam, per se, is an ineffective medium for germinating rye grass seed.

TABLE 6-B

| | Percent Germination | | |
| --- | --- | --- | --- |
| Time after planting | Tray 6-1 no mulch | Tray 6-2 seed-free mulch | Tray 6-3 seeded mulch |
| 1 week | 5 | 0 | 0 |
| 2 weeks | 65 | 3 | 7 |
| 3 weeks | 90 | 7 | 11 |
| 4 weeks | 90 | 15 | 11 |

EXAMPLE 7

This example illustrates the effectiveness of a mulch mat of this invention in producing a higher yield of produce. A slurry was prepared from the components listed in Table 7. A foam produced by aerating the slurry with high speed mixing was applied to a plot of Hungarian pepper seedlings.

In a comparative plot the soil was covered by a landscape fabric and in a control plot the soil was left uncovered as is done for hand cultivation. During the growing season all plots were treated with similar irrigation and environmental exposure. The advantages of using the mulch mat of this invention are illustrated by the results reported in Table 7.

TABLE 7

| Component | parts by weight |
|---|---|
| shredded newspaper | 9.2 parts |
| milled corn cob | 12 parts |
| Yucca shidigera extract | 20 parts |
| starch | 8 parts |
| flour | 4 parts |
| polyvinyl acetate | 10 parts |
| water | 227 parts |

| | plants | | | | Peppers | |
|---|---|---|---|---|---|---|
| Type Mulch | Orig-inal | − Lost | = Survivors | Total Wt | No. | Ave Wt | Total Wt. |
| Foam | 10 | 0 | 10 | 2126 g | 76 | 20.5 g | 1560 g |
| Fabric | 10 | 4 | 6 | 418 g | 12 | 15.5 g | 186 g |
| None | 12 | 10 | 2 | 137 g | 4 | 20 g | 80 g |

EXAMPLE 8

This example illustrates one method of preparing and applying a foamed slurry in the preparation of the mulch mat of this invention. A 4 liter volume of a slurry comprising cellulose fiber, corn cob granules, wheat flour, corn starch and surfactant was placed into a pressure paint can which was sealed and pressurized to 6.8 atmospheres (100 psig) for 48 hours. The pressurized slurry was sprayed to provide a foam until the pressure was reduced to a gauge pressure of 0.8 atmospheres (12 psig).

EXAMPLE 9

This example illustrates the effect of high speed mixing time on the density of foamed slurries of this invention. A master batch of foam slurry was prepared using components listed in Table 9A. Aliquots of the slurry were placed into a 3.8 liter (1 gallon) container and whipped at 2500 rpm for various lengths of time producing foams with densities that decreased with mixing time as indicated in Table 9B.

TABLE 9-A

| Component | parts by weight |
|---|---|
| tissue paper | 80 |
| corn cobs (100–80R) | 50 |
| polyvinyl acetate | 20 |
| starch | 6 |
| dried milk | 6 |
| flour | 6 |
| CAPA | 88 |
| water | 3270 |

TABLE 9B

| Mixing time | Foam density | Expansion |
|---|---|---|
| 30 seconds | 0.22 g/ml | 4.6:1 |
| 40 | 0.23 | 4.4:1 |
| 60 | 0.12 | 8.5:1 |

TABLE 9B-continued

| Mixing time | Foam density | Expansion |
|---|---|---|
| 90 | 0.094 | 10.9:1 |
| 120 | 0.076 | 13.4:1 |

EXAMPLE 10

This example illustrates the biodegradability of a mulch mat of this invention and its compatibility with perennial plants. In June a foam prepared from the slurry of Example 9 whipped for 60 seconds to about 0.1 g/ml density was poured into a summer flower bed containing miniature roses, grape hyacinth, garden phlox, Morden's Gleam loosestrife, malva, and mums; the bed was covered with a 5 cm thick foam which contacted the plant stems. The foam dried in about 24 hours to a coherent mulch mat which suppressed weed growth in the bed while the plants thrived through the fall of the year. The mulch mat degraded over the winter and the perennials in the beds grew in the spring.

EXAMPLE 11

This example illustrates the use of a mulch mat as a weed suppresser and support for a seeding mix of desired plants. Rye grass seed was applied to flats containing fertilized and watered potting mix. A slurry was prepared using the components indicated in Table 11A, whipped into a foam and applied at 2.5 cm thick to the surface of the rye grass-seeded flats and allowed to dry to a mulch mat. Seeds of various species were mixed with fertilized potting soil which was watered and applied in 2.5 cm dots in patterns on the top surface of the mulch mat-covered flats. After 4 weeks in a greenhouse the germination of rye grass and top-seeded species was observed as recorded in Table 11B.

TABLE 11A

| Component | parts by weight |
|---|---|
| water | 3500 |
| shredded newspaper | 100 |
| corn starch | 6 |
| dried milk | 6 |
| wheat flour | 6 |
| guar gum | 6 |
| CAPA | 42 |
| Milled corn cob | 60 |

TABLE 11B

| | Percent germination | |
|---|---|---|
| Seed species | Seed species | Rye grass |
| marigold | 70 | 10 |
| ageratum | 65 | 0 |
| carrot | 80 | 5 |
| lettuce | 95 | 0 |
| cauliflower | 70 | 0 |
| spinach | 65 | 0 |
| radish | 75 | 5 |
| perennial rye | 95 | 10 |
| pumpkin | 70 | 0 |
| squash | 35 | 0 |
| corn | 30 | 5 |
| pepper | 20 | 5 |
| tomato | 25 | 0 |
| snapdragon | 55 | 10 |

TABLE 11B-continued

| | Percent germination | |
|---|---|---|
| Seed species | Seed species | Rye grass |
| bachelor button | 75 | 5 |
| control | — | 5 |

EXAMPLE 12

This example illustrates the use of a mulch mat in a combination of ornamental landscaping and produce production applications. A 1.2×2.4 m (4×8 ft) bed was seeded with onion sets in the pattern of the letters "C&A". A slurry was prepared having the composition indicated in Table 12A. A 4 liter mixture of surfactant/binder/pigment comprising 1 liter of 50% Yucca extract, 1 liter of CAPA, 1 liter of polyvinyl acetate (Elmer's glue) and 1 liter aqueous dispersion of 28 g (1 oz) iron oxide pigment was mixed into 30 gallons of the slurry. The slurry was pressurized to 2 psig and applied as a foam over the onion set bed at 7.5 liters per minute (2 gpm). The onions penetrated the mulch mat forming the "C&A" pattern in a weed free bed. The yield of onions was about a 20% higher than in a hand cultivated control plot.

TABLE 12A

| Component | amount |
|---|---|
| water | 90000 g |
| shredded newspaper | 2400 g |
| corn starch | 240 g |
| wheat flour | 840 g |
| guar gum | 140 g |
| milled corn cob | 1500 g |
| Dowacil 75 fungicide | 6 g |
| CAPA | 754 g |

While the invention has been described in detail and with reference to specific embodiments thereof, it will be apparent to one skilled in the art that various changes and modifications can be made therein without departing from the spirit and scope thereof.

What is claimed is:

1. An air and water-permeable, expanded mulch mat comprising biodegradable fibers, granules and binder wherein the binder is more readily decomposed by microorganisms than the fibers and granules, wherein said mulch mat is made from an aqueous foam.

2. A mulch mat according to claim 1 wherein said biodegradable fibers, granules and binder are in a light-impermeable, open-celled foam structure.

3. A mulch mat according to claim 1 wherein said biodegradable fibers are selected from the group consisting of cellulosic fibers, protein fibers and vinyl polymer fibers.

4. A mulch mat according to claim 3 wherein said biodegradable fibers are cellulosic fibers selected from the group consisting of shredded wood, shredded straw, shredded paper, shredded corn stalk, wood pulp, cotton fiber, sphagnum moss and peat moss.

5. A mulch mat according to claim 1 wherein said binder comprises at least one compound selected from the group consisting of polysaccharide, milk solids, glycoside, vegetable gum, vinyl polymer and vegetable oil.

6. A mulch mat according to claim 1 wherein said granules have an average particle size less than 1 millimeter and comprise at least one material selected from the group consisting of corn cobs, wood, seed hulls, nut shells, seeds, gourds and bark.

7. A mulch mat according to claim 6 having a ratio of fiber to granules in the weight ratio of about 0.05:1 to 10:1.

8. A mulch mat according to claim 7 wherein said fibers comprise pine straw, paper, cotton fiber, a moss, corn stalks or a mixture thereof or a mixture with other biodegradable fiber; wherein said granules comprise milled corn cob, milled corn, milled soybean, milled nut hulls, milled grain hulls or a mixture thereof or a mixture with other biodegradable granules; wherein said binder comprises starch, grain flour, milk solids, vegetable gum, polyvinyl acetate or a mixture thereof or a mixture with other biodegradable polymer.

9. A mulch mat according to claim 8 wherein said mulch mat comprises surfactant, soil builder, plant nutrient, soil conditioner, fungicide, bactericide or a mixture thereof.

10. A mulch mat according to claim 1 further comprising a surface layer of seeds and seed germinating medium.

11. A foam adapted to be applied in a layer which dries into a biodegradable, air and water permeable, unitary mulch mat according to claim 1, wherein said foam comprises a gas-entrained, aqueous slurry of biodegradable fiber, granular material, binder and surfactant having a density less than 0.4 g/ml.

12. A method comprising applying to the surface of soil or other plant growing medium an aqueous foam comprising fiber, granules and biodegradable binder adapted to dry into a biodegradable, air and water-permeable, weed suppressing unitary mulch mat wherein the binder is more readily decomposed by microorganisms than the fiber and granules.

13. A method according to claim 12 wherein said foam is prepared by entraining a gas into an aqueous slurry comprising biodegradable fibers, granules, polymeric binder and surfactant.

14. A method according to claim 13 wherein said slurry comprises from about 5 to 35 weight percent solids and a weight ratio of fibers to granules in the range of about 0.05:1 to 10:1.

15. A method according to claim 14 wherein said surfactant comprises a saponin.

16. A method according to claim 11 wherein seed is incorporated into said foam to provide a method of seeding with weed suppression.

17. A method comprising applying to the surface of soil or other plant growing medium an aqueous foam comprising fiber, granules and binder adapted to dry into a biodegradable, air and water-permeable, weed suppressing unitary mulch mat wherein seed-containing germination medium is applied to the surface of said mulch mat to provide a method of seeding with weed suppression.

18. A biodegradable, air and water-permeable, weed-suppressing mulch mat comprising fibers, granules and biodegradable binder, wherein the binder is more readily decomposed by microorganisms than the fiber and granules, wherein said mulch mat is made from an aqueous foam.

19. A mulch mat according to claim 18 wherein the binder is selected to provide a service life of between 2 months and 3 years.

* * * * *